(12) United States Patent
Poon et al.

(10) Patent No.: US 8,917,748 B2
(45) Date of Patent: Dec. 23, 2014

(54) AMPLITUDE AND PHASE MODULATION OF A LASER BY MODULATION OF AN OUTPUT COUPLER

(75) Inventors: Joyce Kai See Poon, Toronto (CA); Wesley David Sacher, Mississauga (CA)

(73) Assignee: The Governing Council of the University of Toronto, Toronto (CA)

( * ) Notice: Subject to any disclaimer, the term of this patent is extended or adjusted under 35 U.S.C. 154(b) by 69 days.

(21) Appl. No.: 13/634,295

(22) PCT Filed: Mar. 21, 2011

(86) PCT No.: PCT/CA2011/000291
§ 371 (c)(1),
(2), (4) Date: Sep. 12, 2012

(87) PCT Pub. No.: WO2011/113150
PCT Pub. Date: Sep. 22, 2011

(65) Prior Publication Data
US 2012/0327961 A1    Dec. 27, 2012

Related U.S. Application Data

(60) Provisional application No. 61/315,686, filed on Mar. 19, 2010.

(51) Int. Cl.
| *H01S 3/10* | (2006.01) |
| *H01S 3/08* | (2006.01) |
| *H01S 3/105* | (2006.01) |
| *H04B 10/50* | (2013.01) |
| *H01S 3/083* | (2006.01) |
| *H01S 3/107* | (2006.01) |

(52) U.S. Cl.
CPC ............. *H01S 3/105* (2013.01); *H01S 3/10038* (2013.01); *H04B 10/504* (2013.01); *H01S 3/083* (2013.01); *H01S 3/107* (2013.01)
USPC ............................................ 372/26; 372/108

(58) Field of Classification Search
USPC .................................................... 372/26, 108
See application file for complete search history.

(56) References Cited

U.S. PATENT DOCUMENTS 4,104,598 A * 8/1978 Abrams ........................ 372/106
5,621,560 A   4/1997 Wood
(Continued)

OTHER PUBLICATIONS

Arpad L. Scholtz et al., "Single-mode Laser Intracavity Coupling Modulation" IEEE Journal of Quantum Electronics, vol. QE-17, No. 3, Mar. 1981.
Wesley D. Sacher et al., "Characteristics of Microring Resonators with Waveguide-Resonator Coupling Modulation", Journal of lightwave technology, vol. 27, No. 17, Sep. 1, 2009.
(Continued)

*Primary Examiner* — Armando Rodriguez
(74) *Attorney, Agent, or Firm* — Bereskin & Parr LLP/S.E.N.C.R.L., s.r.l.

(57) ABSTRACT

There is provided an output coupler modulated laser. The laser includes an optical resonator for light to circulate within, a gain medium housed within the optical resonator and a pump. An output coupler included in the optical resonator is responsive to a control signal to generate a modulated optical signal at a laser output port, and a complementary signal at a through port to retain circulating light within the optical resonator. The output coupler and the pump are jointly controllable to maintain the power level of the circulating light substantially at a selected, steady state level, and to decouple the modulation response of the laser from the intrinsic response of the circulating light due to interaction with the gain medium. The output coupler is configurable for simple amplitude modulation, Phase-Shift Keying (PSK), Quadrature Amplitude Modulation (QAM), and is suitable for use with high-finesse, micron or millimeter scale resonators.

34 Claims, 13 Drawing Sheets

(56) References Cited

U.S. PATENT DOCUMENTS

| | | |
|---|---|---|
| 5,723,856 A | 3/1998 | Yao et al. |
| 5,793,782 A | 8/1998 | Meyrueix |
| 5,917,179 A | 6/1999 | Yao |
| 6,052,495 A | 4/2000 | Little et al. |
| 6,633,696 B1 | 10/2003 | Vahala et al. |
| 6,834,134 B2 | 12/2004 | Brennan, III et al. |
| 7,106,917 B2 | 9/2006 | Painter et al. |
| 7,835,646 B2 * | 11/2010 | Vaissie et al. .......... 398/84 |
| 2001/0004411 A1 | 6/2001 | Yariv |
| 2003/0099273 A1 | 5/2003 | Murry et al. |

OTHER PUBLICATIONS

Yariv, "Universal relations for coupling of optical power between the microresonators and dielectric waveguides", Electronics Letters, Feb. 17, 2000, vol. 36, No. 4, pp. 321-322.

Written Opinion mailed Jan. 30, 2014, Singapore Patent Application No. 201206918-3.

Office Action dated Mar. 3, 2014, Chinese Application No. 2011800244446.2 to The Governing Council of the University of Toronto.

* cited by examiner

AMPLITUDE AND PHASE MODULATION OF A LASER BY MODULATION OF AN OUTPUT COUPLER

This application is a National Stage of International Application No. PCT/CA2011/000291, which claims the benefit of U.S. Provisional Application No. 61/315,686, filed Mar. 19, 2010, the entire contents of which is hereby incorporated by reference.

FIELD

Embodiments of the present invention relate generally to lasers, and more particularly to a controllable output coupler for a laser that enables direct amplitude and phase modulation of emitted optical signals.

INTRODUCTION

Optical communication systems use light to transmit information and outperform other types of communication systems, such as electrical wire line communication systems, in certain respects. For example, optical communication systems tend to have larger bandwidths and lower losses, which makes them suitable for longer distance, high bit rate transmission links. The transmitter used in the optical system will commonly be a form of light emitting diode or a laser diode whose output is coupled into a downstream fiber optic cable. To transmit information optically, the light wave is modulated (i.e. varied) to encode the transmission data signal. Different techniques for modulating laser output have been developed, which include both direct and external modulation schemes. The physical properties of the optical transmitter will generally impose limits on the available modulation schemes. Much remains in the way of optimizing laser design for optical data modulation.

SUMMARY

In accordance with an aspect of embodiments of the present invention, there is provided a modulated laser. The laser includes an optical resonator for light to circulate within. A gain medium is housed within the optical resonator in the path of the circulating light, and a pump delivers excitation energy to the gain medium above a laser threshold of the optical resonator to bring the circulating light into coherent oscillation. The optical resonator further includes an output coupler in the path of the circulating light. The output coupler is responsive to a control signal to selectively allow a fraction of the circulating light to exit the optical resonator as a modulated optical signal.

The output coupler can have an input port through which the circulating light is received into the output coupler and an output-coupled port through which the modulated optical signal is emitted. A through port of the output coupler is also included in the output coupler through which to retain unemitted light within the optical resonator. The through port can be complementary to the output-coupled port.

The output-coupler can further include an interference section that optically couples the input port with each of the output-coupled port and through port. An operating characteristic of the interference section can be controllable by the control signal to provide selective optical interference in the interference section, generating the modulated optical signal at the output-coupled port and an optical signal complementary to the modulated optical signal at the through port. The operating characteristic of the interference section can be one of a refractive index and/or a gain/attenuation change. The interference section of the output coupler can be formed integrally with the optical resonator.

The output coupler can include at least one Mach-Zehnder Interferometer (MZI). The output coupler can further include a directional coupler, a cross-switch coupler, a multi-mode interference coupler, a waveguide junction and splitter, a Bragg reflector, or a resonator.

In response to the control signal, the output coupler can modulate at least one of amplitude and phase in the modulated optical signal. In particular, the output coupler can apply any of an amplitude modulation, a Phase-Shift Keying (PSK), and a Quadrature Amplitude Modulation (QAM) scheme to the modulated output signal.

The output coupler and the pump are jointly controllable to decouple the modulation response of the laser from the intrinsic response of the light circulating within the optical resonator due to interaction with the gain medium. In this way, the laser can thereby substantially inherit the modulation response of the output coupler.

The output coupler and the pump are jointly controllable to maintain a power level of the circulating light within an operable range around at a selected, steady-state power level.

The output coupler can be controllable at a modulation rate selected to exceed a relaxation resonance frequency of the laser, and to provide amplitude changes in a coefficient of output-coupling.

The pump can be configured to deliver excitation energy to the gain medium to maintain a power level of the circulating light within an operable range around a selected, steady-state power level. In some embodiments, the excitation energy can be dc excitation energy.

The modulated output signal can be free of chirp or have controllable chirp.

The optical resonator can include a ring structure having opposite ends optically coupled with the input and through ports of the output coupler, thereby defining a ring resonator for the circulating light. Alternatively, the optical resonator can further comprise a reflector optically coupled to each of the input port and through port of the output coupler, thereby creating a standing wave pattern for the circulating light in the optical resonator. The reflectors can be distributed feedback (DFB) gratings or distributed Bragg reflector (DBR) geometries. One or more of the reflectors can also house the gain medium.

The modulated laser can further include at least one wavelength tuning section included in the optical resonator in the path of the circulating light or alternatively in the reflectors. The wavelength tuning section can selectively adjust a refractive index or optical feedback of the optical resonator to control the wavelength of the modulated optical signal. One or more of the reflectors can provide the wavelength tuning section.

The output coupler can be formed monolithically on a semiconductor die. Alternatively, the output coupler can be integrated heterogeneously within the optical resonator. The optical resonator can be a high-finesse, micron or millimeter scale resonator.

In accordance with another aspect of embodiments of the present invention, there is provided a method of modulating a laser comprising an optical resonator for light to circulate within, and a gain medium housed within the optical resonator in the path of the circulating light. The method includes delivering excitation energy to the gain medium above a laser threshold of the optical resonator to bring the circulating light into coherent oscillation, providing an output coupler in the optical resonator in the path of the circulating light, and determining a control signal for the output coupler. The output coupler, which is responsive to the control signal, is caused to selectively allow a portion of the circulating light to exit the optical resonator. The method further includes controlling the output coupler using the control signal to generate a modulated optical signal.

Controlling the output coupler can involve receiving the light circulating in the optical resonator into an input port of the output coupler, generating the modulated optical signal at an output-coupled port of the output coupler in response to the control signal, and directing unemitted light to a through port of the output coupler to be retained within the optical resonator.

An interference section can optically couple the input port with each of the output-coupled port and the through port. An operating characteristic of the interference section can be controlled using the control signal to provide selective optical interference in the interference section. Controlling the operating characteristic of the interference section can generate the modulated optical signal at the output-coupled port and an optical signal complementary to the modulated optical signal at the through port. The operating characteristic of the interference section can be one of refractive index and/or gain/attenuation change.

Controlling the output coupler can comprise modulating at least one of amplitude and phase in the modulated optical signal in response to the control signal. In particular, the output coupler can be controlled to apply any of an amplitude modulation, a Phase-Shift Keying (PSK), and a Quadrature Amplitude Modulation (QAM) scheme to the modulated output signal.

The method can further include jointly controlling the output coupler and the pump to decouple the modulation response of the laser from the intrinsic response of the light circulating within the optical resonator due to interaction with the gain medium. In this way, the laser can thereby substantially inherit the modulation response of the output coupler.

The method can further include jointly controlling the output coupler and the pump to maintain a power level of the circulating light within an operable range around at a selected, steady-state power level.

Controlling the output coupler can comprise selecting a modulation rate that exceeds a relaxation resonance frequency of the laser, and controlling the output coupler at the selected modulation rate. Controlling the output coupler can further comprise controlling amplitude changes in a coefficient of output-coupling.

The excitation energy delivered to the gain medium can be dc excitation energy.

The modulated output signal can be free of chirp or have controllable chirp.

The method can further include controlling a wavelength of the modulated optical signal by selectively adjusting a refractive index or optical feedback of the optical resonator using at least one wavelength tuning section included in the optical resonator in the path of the circulating light.

These and other features of the embodiments as will be apparent are set forth and described herein.

BRIEF DESCRIPTION OF THE DRAWINGS

A detailed description of various embodiments is provided herein below with reference, by way of example, to the following drawings.

Figure 1:
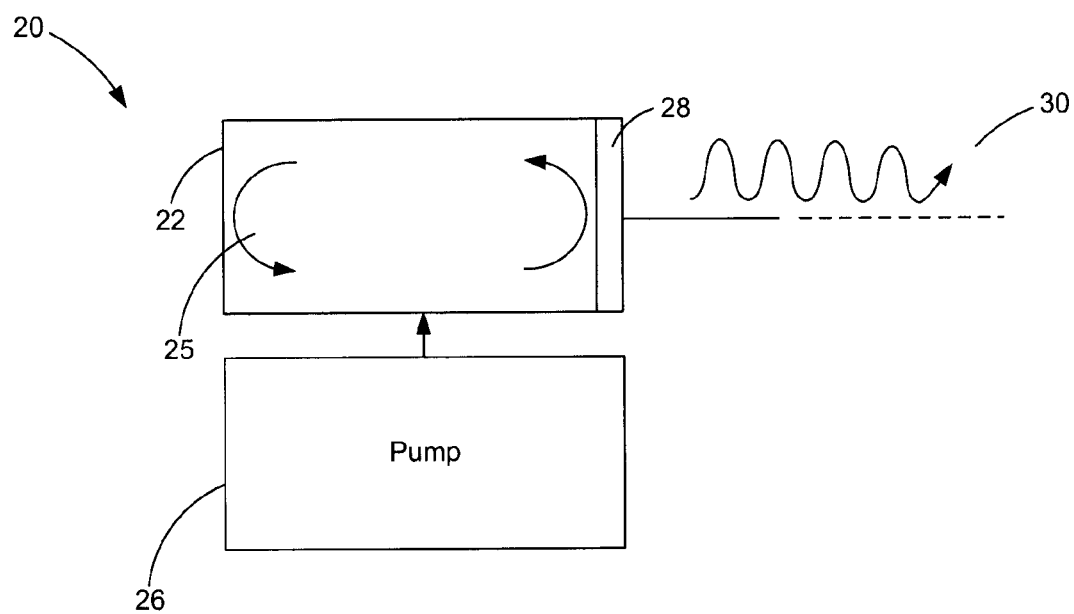
FIG. 1 is a schematic diagram illustrating the components of a laser.

It will be understood that reference to the drawings is made for illustration purposes only, and is not intended to limit the scope of the embodiments described herein below in any way. For convenience, reference numerals may also be repeated (with or without an offset) in the figures to indicate analogous components or features.

DETAILED DESCRIPTION OF EMBODIMENTS

It will be appreciated that for clarity, the following discussion will include specific details relating to various aspects of embodiments of the invention, but may also omit other details wherever convenient or appropriate to do so. For example, discussion of like or analogous features in alternative embodiments may be somewhat abbreviated. Well-known ideas or concepts may also for brevity not be discussed in any great detail. The skilled person will recognize that implementing embodiments of the invention may not require certain of the specifically described details in every case, which are included herein only to provide a thorough understanding of the embodiments. Similarly it will become apparent that the described embodiments may be susceptible to slight alteration or variation according to common general knowledge without departing from the scope of the disclosure. The following detailed description of embodiments is not to be regarded as limiting the scope of the present invention in any manner.

Referring initially to FIG. 1, shown therein is a schematic representation of a laser according to an exemplary embodiment. The laser 20 includes an optical resonator 22 that defines a circulation path for light confined within the optical resonator 22. It should be understood that confinement of light could be provided in the optical resonator 22 according to different mechanisms, for example by a boundary between a higher refractive index material and a lower refractive index material. A gain medium 25 housed inside the optical resonator 22 is pumped with a suitable excitation source, such as pump 26. The gain medium 25 can be made from any suitable optically amplifying material and, without limitation, can be made from a solid, a liquid, a gas, or plasma. In the particular case of a diode laser, the gain medium 25 can comprise suitable semiconductor materials. The pump 26 can be configured to deliver different forms of energy to the gain medium 25. For example, the pump 26 can be configured to deliver electrical energy (e.g. an applied voltage), optical energy (including either laser light or incoherent light), or any other suitable energy form as the skilled person would appreciate. The term "optical resonator" as used herein should be understood to include optical cavities.

Light of a characteristic wavelength passing through the gain medium 25 is coherently amplified through stimulated emission. As will be appreciated, when the gain medium 25 is pumped to and above a laser threshold of the optical resonator 22, light circulating in the optical resonator 22 reaches laser oscillation and the laser 20 outputs a coherent light wave. The balance between the gain saturation of the gain medium 25 and the excitation energy delivered by the pump 26 produces a steady-state power inside the optical resonator 22; this steady-state power determines the operating point of the laser 20 and is selectable by controlling the output of the pump 26.

The laser 20 also includes an output coupler 28 that allows a portion of the light circulating within the optical resonator 22 to exit. Typically the output coupler 28 is a passive (i.e. not actively controlled) element, such as a partially transparent mirror. Most of the light striking the surface of the mirror is reflected back into the optical resonator 22, while a small fraction of the light (perhaps ~1-5% of the internal steady-state power) transmits through the mirror and becomes the laser output signal 30. In such a configuration, the output coupler 28 would not be directly controlled. To modulate the output signal 30 would require active control over some other system component. For example, as the skilled person will appreciate, direct pump-modulation and external modulation schemes may be employed. The laser 20 could also be operated in a mode-locked or Q-switched configuration to provide variable laser output. Alternatively, in accordance with aspects of embodiments of the present invention, and as will be described in greater detail below, a modulated output coupler (seen in FIG. 5) included in the optical resonator 22 can be used to achieve pseudo-direct modulation of the laser output signal 30. Such arrangement can confer significant advantages over these other modulation schemes in terms of available operating bandwidth, signal distortion (e.g., chirp), power efficiency, and size.

Figure 2:
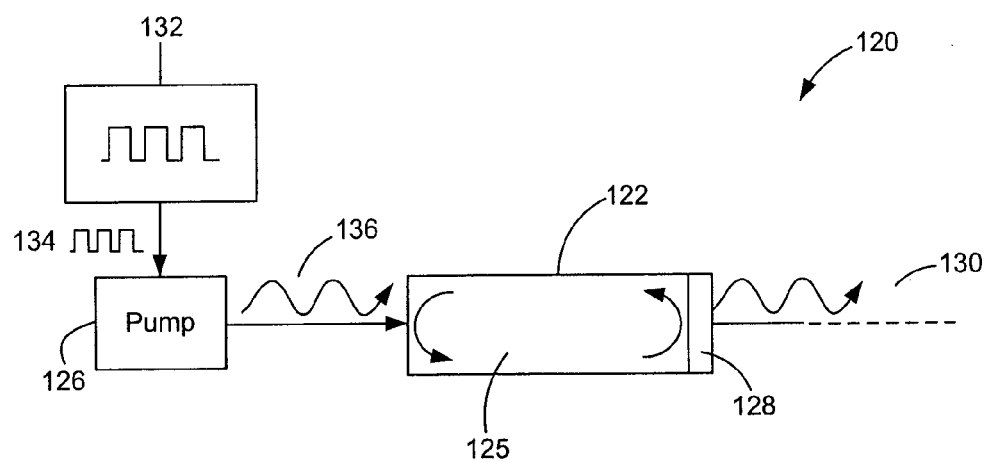
FIG. 2 is a schematic diagram illustrating direct pump-modulation of a laser.

FIG. 2 schematically illustrates a pump-modulated laser. The laser 120 is similar to the laser 20 shown in FIG. 1, but controller 132 generating a control signal 134 for the pump 126 is also included. The controller 132 can be integrated within the laser 120 or provided as a separate circuit as the case may be. The control signal 134 determines the rate and magnitude of the pump excitation signal 136 delivered to the gain medium 125. Again the gain medium 125 is housed inside an optical resonator 122, and the laser output signal 130 is allowed by the output coupler 128 to exit the optical resonator 122. The response of the gain medium 125 to the varying excitation signal 136 causes a controllable variation in the amount of power circulating in the optical resonator 122, which is then passively coupled through the output coupler 128 to generate a modulated output signal 130. In this way, the modulated output signal 130 inherits the modulation response of the gain medium 125 due to the direct pump modulation.

The useful range of operation of the pump-modulated laser 120, however, is limited by, among other things, the physical properties of the optical resonator 122 and gain medium 125. In particular, the laser 120 is characterized by its relaxation resonance frequency, which for semiconductors is approximately $$\omega_R = \sqrt{\frac{AP_0}{\tau_p}}, \quad (1)$$

where A represents the differential gain constant of the gain medium 125, $P_0$ represents steady-state photon density within the optical resonator 122, and $\tau_p$ represents photon lifetime within the optical resonator 122. The relaxation resonance frequency $\omega_R$ provides a measure of how fast the gain medium 125 can respond to variations of the internal circulating power and vice-versa. In practical terms, the relaxation resonance frequency $\omega_R$ sets an effective upper limit on the modulation rate of the pump 126 before the response of the modulated output signal 130 will be too distorted and/or too small to encode a transmission data signal.

Figure 3:
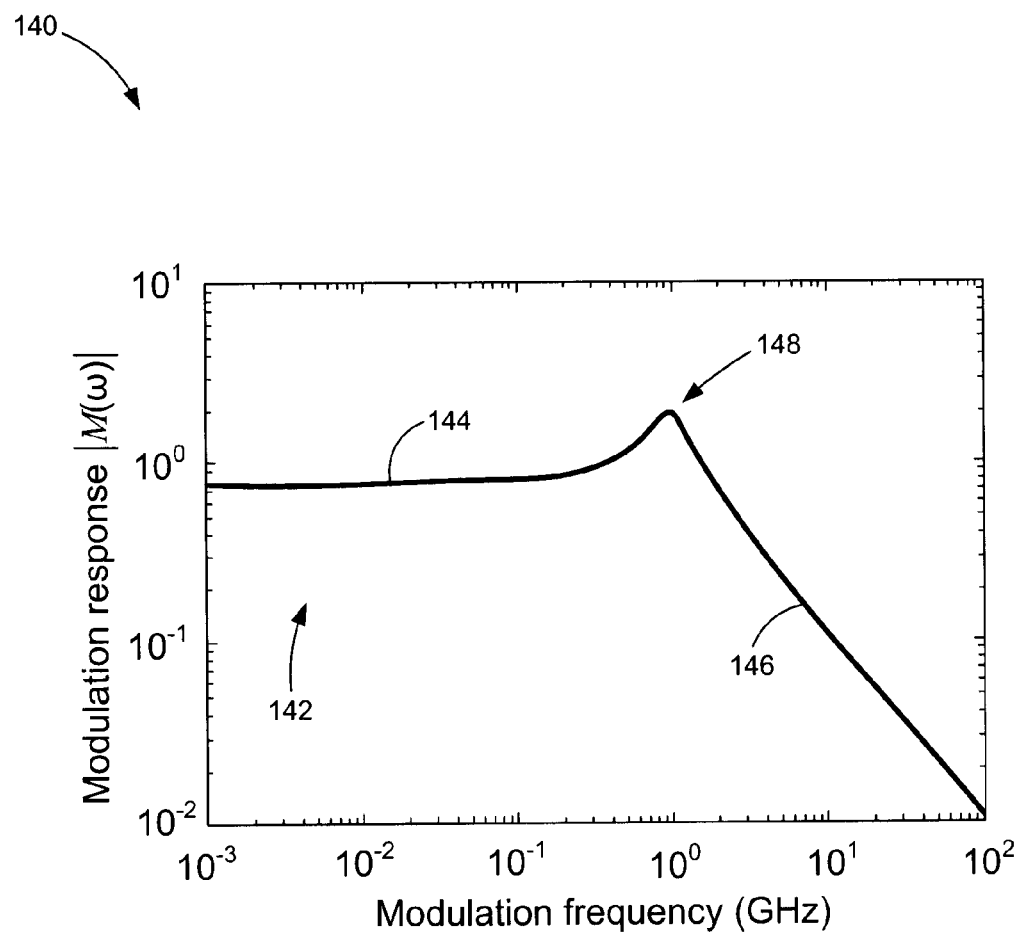
FIG. 3 is a graph illustrating an exemplary small signal modulation response of the pump-modulated laser shown in FIG. 2.

FIG. 3 shows a graph of an exemplary small signal modulation response of the pump-modulated laser 120 shown in FIG. 2. The graph 140 plots modulation frequency (in GHZ) on the x-axis against modulation response (in dB) on the y-axis. It should be understood that the graph 140 is but one exemplary modulation response of a pump-modulated laser 120, and that different pump-modulation configurations could produce different responses. No numerical range or feature of the graph 140 is limiting.

Curve 142 includes a generally flat region 144 over a range of low modulation frequencies, in which the modulation response of the optical resonator 122 shows a large response to the modulation signal and no appreciable dependence on modulation frequency. Within this low frequency range, modulating the excitation energy signal 136 produces corresponding variations in the intra-cavity field strength of the optical resonator 122, which are then passively coupled out of the optical resonator 122 to generate the modulated output signal 130. Generally flat region 144 can therefore represent the useful operating region of the pump-modulated laser 120.

However, the modulation response exhibits a dependence on modulation frequency once curve 142 enters into the roll-off region 146. In other words, the modulation response to variations in the excitation energy signal 136 begins to diminish for larger modulation frequencies in the frequency range defined by roll-off region 146. In effect, the gain medium 125 is no longer able to respond quickly enough to the variations in the excitation energy signal 136. As a result the modulated output signal 130 no longer inherits the modulation response to variations in the excitation energy signal 136. The transition point between the generally flat region 144 and roll-off region 146 is the relaxation resonance frequency $\omega_R$ of the optical resonator 122, indicated by a knee-point 148 in curve 142. Thus, it is evident from the characteristics of curve 142 that relaxation resonance frequency $\omega_R$ represents an effective upper frequency limit for the modulation rate of the pump-modulated laser 120.

Figure 4:
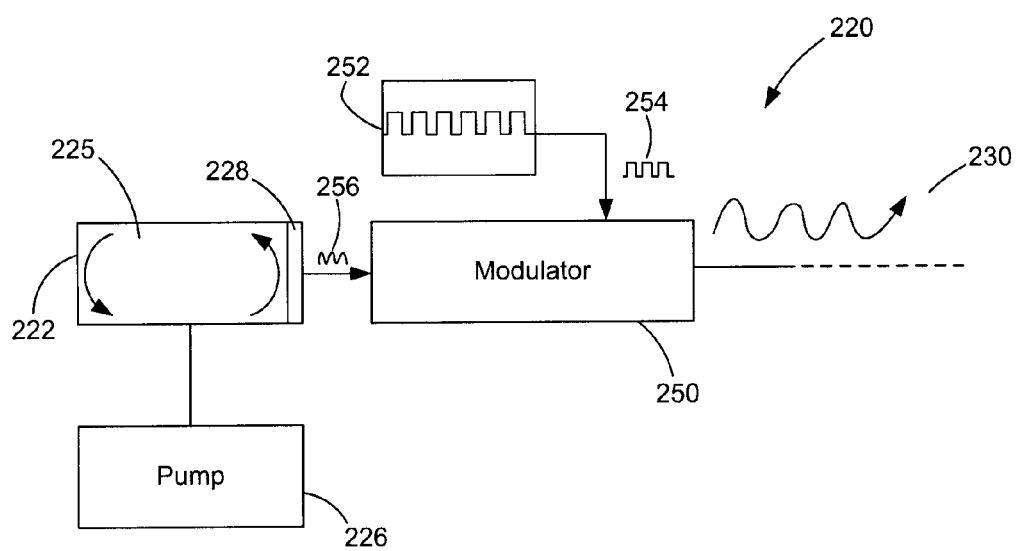
FIG. 4 is a schematic diagram illustrating external modulation of a laser.

The relaxation resonance frequency $\omega_R$ is dictated largely by the physical properties of the optical resonator 122, gain medium 125, and operation bias of the laser 120. Techniques exist to increase the relaxation resonance frequency $\omega_R$ by changing the resonator physical properties, which can increase the useful operating range of the pump-modulated laser 120. For example, these techniques include engineering of the quantum confinement in the active medium, utilizing injection locking techniques, and leveraging cavity quantum electrodynamics effects. However, as relaxation resonance frequency $\omega_R$ tends to be inversely related to the resonator quality factor ("Q factor"), as suggested in Eq. 1, increasing the relaxation resonance frequency $\omega_R$ often decreases the Q factor by a corresponding amount. For applications requiring large Q factor resonators, it can be necessary to compromise on lower modulation rates, or else use an external modulator (such as is shown in FIG. 4). Accordingly, pump-modulation may not be acceptable for all optical transmission applications.

Direct-pump modulation of the laser 120 can also suffer unavoidably from chirp in the modulated optical signal 130. As the excitation energy delivered from the pump 126 to the optical resonator 122 is modulated, both the gain and refractive index of the gain medium 125 inside the optical resonator 122 will vary in response. As a result of these variations, unwanted phase shifts (or "chirp") are unavoidably introduced into the modulated output signal 130, even though there is only active effort to control the amplitude of the modulated output signal 130 (e.g. simple intensity modulation). Thus, chirp represents another potentially significant limitation on the utility of direct pump-modulation schemes.

Referring now to FIG. 4, shown therein is a schematic representation of an externally modulated laser. The laser 220 is similar to the laser 20 but includes external modulator 250 responsive to a control signal 254 generated by controller 252. In the externally modulated laser 220, pump 226 delivers relatively constant excitation energy to the gain medium 225, thereby maintaining a relatively constant, steady-state power circulating internally within the optical resonator 222. Output coupler 228 may again be a passive element, but this time providing a continuous-wave (CW) optical signal 256 to the external modulator 250 for amplitude and/or phase modulation. In response to the control signal 254, external modulator 250 transforms the CW optical signal 256 into the modulated output signal 230. For example, external modulator 250 can comprise one or more variable switches, for example based on Mach-Zehnder Interferometers (MZI) or electro-absorption modulators, which are configurable by the control signal 254 to modulate the CW optical signal 256. For example, the external modulator 250 can provide one or more of gain, absorption, constructive interference, or destructive interference of the CW optical signal 256 to achieve modulation. By suitable generation of the control signal 254, the modulated output signal 230 can optically encode a transmission data signal according to one or more different modulation schemes.

The external modulator 250 overcomes some of the limitations inherent to the pump-modulated laser 120 as described herein. For example, configuring an MZI in the external modulator 250 for push-pull operation can produce modulated output that is ideally free of chirp. Quadrature amplitude modulation (QAM), involving simultaneous modulation of both amplitude and phase, can also be realized by including a nested MZI in each arm of the MZI in the external modulator 250. The modulation rate of the external modulator 250 can also greatly exceed the relaxation resonance frequency $\omega_R$ of the laser 220. These various considerations make the external modulator 250 suitable for use in high data rate optical transmission links.

At the same time, the modulator 250 will tend to require relatively large amplitude input drive. The power of the CW optical signal 256 already represents a significant reduction of the internal steady-state power of the optical resonator 222 due to the low transmission coefficient of the output coupler 228. For many practical optical communication systems, the output optical power from the laser 220 (i.e. the power of the CW optical signal 256) will be on the order of what is required for the modulated optical signal 230 to be transmitted error-free over the transmission link. Thus, to achieve high extinction ratios within the modulator 250 without significant loss of transmission power, large differential phase delays (or alternatively gains/absorptions) requiring relatively large input drive amplitude will be required. For example, it may be necessary for the modulator 250 to apply large phase shifts, at least on the order of about π or $$\frac{\pi}{2},$$

to the CW optical signal 256 to maximize the extinction ratio of the modulated output signal 230. As will be explained more with reference to FIG. 5, modulation of the laser output coupler rather than an external switch, such as modulator 250, leverages the comparatively large internal power circulating in the optical resonator 222 to achieve significant efficiency gains in the modulation, while at the same time retaining a large modulation bandwidth and enabling amplitude-phase modulation of the modulated output signal 230. Advantageously, because a large internally circulating power is desirable, high-finesse micron-scale resonators can also be used, which additionally provides an increased free spectral range (FSR).

Figure 5:
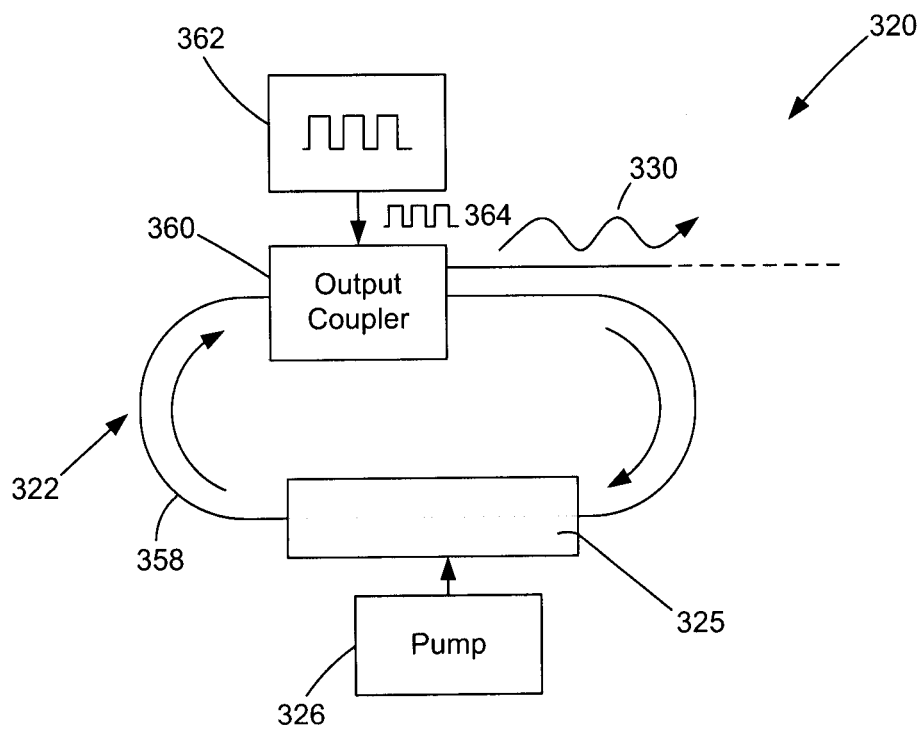
FIG. 5 is a schematic diagram illustrating a ring laser with a modulated output coupler, according to embodiments of the present invention.

FIG. 5 shows a schematic representation of a ring laser incorporating a modulated output coupler in accordance with embodiments of the present invention. The laser 320 comprises an optical resonator 322 defining a confinement path for light to circulate therewithin, a pump 326 and a modulated output coupler 360. A gain medium 325 is housed inside the optical resonator 322 and situated in the path of the laser light circulating within the optical resonator 322. As illustrated in FIG. 5, opposite ends of the output coupler 360 may be optically coupled to corresponding opposite ends of the ring structure 358 to define a circular confinement path in the optical resonator 322, such that each of the ring structure 358 and the output coupler 360 provides a portion of the optical resonator 322. The connections between the output coupler 360 and ring structure 358 provide optical coupling therebetween, defining a ring geometry for the optical resonator 322, i.e. a ring resonator. The output coupler 360 can be formed monolithically on a semiconductor die. Alternatively, the output coupler 360 can be integrated heterogeneously with the ring structure 358 within the optical resonator 322. The optical resonator 322 can also be a high-finesse, micron-scale resonator in some embodiments. For example, the optical resonator 322 can be micron or millimeter scale.

As described herein, the gain medium 325 housed in the optical resonator 322 enables laser operation. Pump 326 delivers excitation energy to the gain medium 325 above the laser threshold to achieve coherent oscillation in the optical resonator 322 and generate laser output. The optical resonator 322 formed, in part, by the ring structure 358 and the output coupler 360 provides a continuous path for the laser light confined within the optical resonator 322 to circulate. Thus, in the embodiment illustrated in FIG. 5, laser light circulates in the optical resonator 322 in a traveling wave manner.

The output coupler 360 is included in the optical resonator 322 in the path of the circulating wave of laser light and is responsive to control signal 364 generated by the controller 362. Light received from the ring structure 358 into the output coupler 360 is either coupled to the laser output or back into the ring structure 358 in response to the control signal 364. As a result, a portion of the circulating light is selectively allowed by the output coupler 360 to exit from the optical resonator 322 as the modulated output signal 330. Light received into the output coupler 360 but not emitted from the optical resonator 322 is retained in the optical resonator 322 where it continues to circulate.

The output coupler 360 can be a variable coupler that is selectively configurable by the control signal 364 to modulate the output signal 330. In particular, the output signal 330 can be modulated in one or both of amplitude and phase, and according to simple or more advanced modulation schemes. For example, it is possible to generate control signal 364 in conjunction with an appropriately configured output coupler 360 so that information is imparted onto one or both of the amplitude and phase of the modulated output signal 330. This enables the laser 320 to operate by applying both Phase-Shift Keying (PSK) and Quadrature Amplitude Modulation (QAM) schemes to the modulated output signal 330. Of course, the skilled person will appreciate that other modulation schemes may be applied as well, including for example Amplitude-Shift Keying (ASK) and simple amplitude modulation. This list of schemes is not understood to be limiting.

Figure 6:
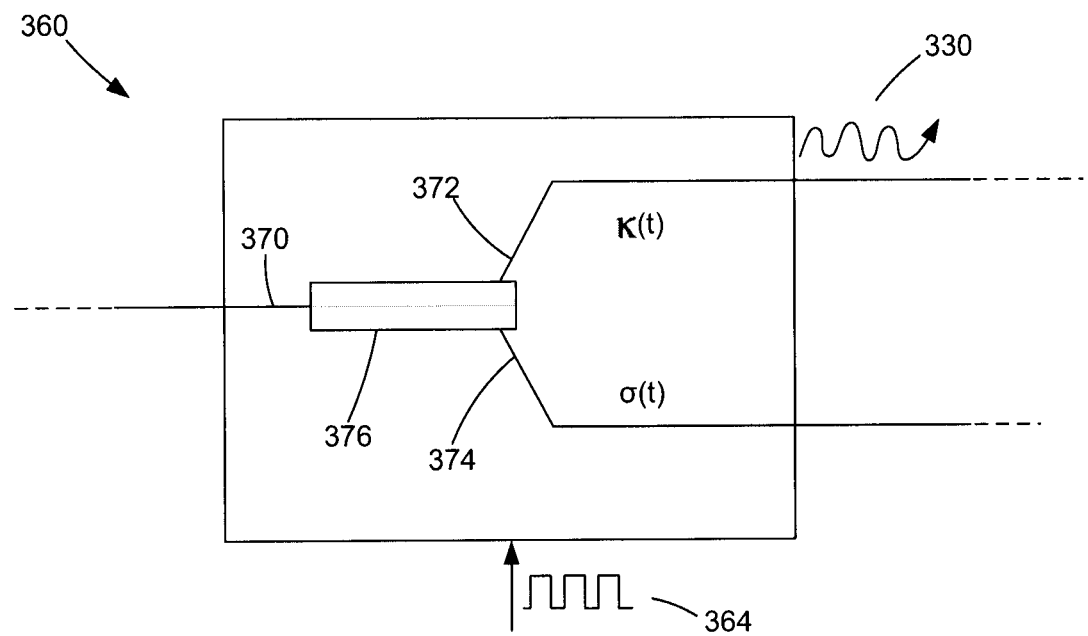
FIG. 6 is a schematic diagram illustrating the modulated output coupler shown in FIG. 5.

FIG. 6 schematically illustrates the output coupler 360 shown in FIG. 5 in greater detail. An input port 370 of the coupler 360 is connected and optically coupled to the corresponding first end of the ring structure 358 adjacent the input port 370, and provides a low loss interface for light to be received therefrom into the output coupler 360. The output coupler 360 also includes an output-coupled port 372 from which the modulated optical signal 330 is emitted, for example to a downstream optical communication link, such as an optical fiber. A through port 374 of the output coupler 360 is also connected and optically coupled to a corresponding opposite end of the ring structure 358 adjacent the through port 374, and provides another low loss interface for light to be transmitted back thereto. With this configuration of the output-coupled and through ports 372,374, light which does not exit the optical resonator 322 by the output-coupled port 372 is retained within the optical resonator 322 by way of the through port 374. The input and through ports 370, 374 of the output coupler 360 combine with the ring structure 358 to provide a closed loop for continuous circulation of laser light within the optical resonator 322.

The input port 370 feeds an interference section 376, the downstream end of which is optically coupled with both the output-coupled and through ports 372, 374. Thus, the interference section 376 of the output coupler 360 can be formed integrally within the optical resonator 322, as opposed to being provided externally to the optical resonator 322 (as may be the case in external modulation schemes). The control signal 364 generated by the controller 362 and provided to the output coupler 360 configures the interference section 376 so that the input optical power received at the input port 370 is apportioned between the output-coupled and through ports 372,374. Accordingly, the electric field of the optical wave seen at the output-coupled port 372, denoted $E_{out}(t)$ and which is representative of the amplitude and phase of the modulated output signal 330, can be given by $$E_{out}(t) = \kappa(t) \cdot E_{in}(t), \quad (2)$$

where $\kappa(t)$ represents a coupling coefficient between the input port 370 and output-coupled port 372, and $E_{in}(t)$ represents the electric field circulating internally in the optical resonator 322 that is incident on the input port 370. As will be appreciated, the circulating power inside the optical resonator is proportional to $|E_{in}(t)|^2$, so that $|\kappa(t)|^2$ correspondingly represents the percentage of circulating power $P_{in}(t)$ in the optical resonator 322 that is coupled to the output-coupled port 372. Assuming a lossless output coupler 360, the input power $P_{in}(t)$ will be conserved between the output-coupled and through ports 372,374, such that $$|\kappa(t)|^2 + |\sigma(t)|^2 = 1, \quad (3)$$

where $\sigma(t)$ represents a coupling coefficient between the input port 370 and through port 374, which, in satisfaction of Eq. 3, is complementary to the output-coupling coefficient $\kappa(t)$. As is conventional, the absolute value squared represents power. Thus, by way of Eq. 3, the signal provided to the through port 374 can be complementary to the modulated output signal 330 emitted from the output-coupled port 372. The relationship specified in Eq. 3 can also be modified depending on whether the output coupler 360 is lossy or has net gain. In the lossy case, the left side of Eq. 3 can sum to a value less than 1. In the case of net gain, it can sum to a value greater than 1.

It is evident from Eq. 2 that the output of the coupler 360 depends generally on both the internal circulating field $E_{in}(t)$ in the optical resonator 322, as well as the instantaneous gating of the output-coupled port 372 represented by the output-coupling coefficient $\kappa(t)$. However, if an essentially static (i.e., steady-state) internally circulating field amplitude, denoted $E_{in,0}$, could be maintained in the optical resonator 322, then Eq. 2 could be simplified so that the optical output depends only on the output-coupling coefficient $\kappa(t)$. Control over the output-coupling would then in effect result in modulation of the laser output.

For $E_{in}(t)$ to achieve an essentially steady-state at $E_{in,0}$, the pump 326 can be configured to deliver excitation energy to the gain medium 325 to maintain a quasi-constant amplitude of the circulating field. The excitation energy delivered to the gain medium 325 can be dc excitation energy, but can also have a time-varying compensation component as described below. Additionally, to achieve an essentially steady-state internal field $E_{in,0}$, the modulation rate of the output coupler 360 can be selected to be much greater than the relaxation resonance frequency $\omega_R$ of the optical resonator 322. For modulation rates much greater than the relaxation resonance frequency $\omega_R$, the photon density within the optical resonator 322 will no longer be able to respond to changes in its operating conditions, and thus will remain largely unaffected by small changes in the output-coupling coefficient $\kappa(t)$. However, as will be described in more detail, large changes in the output-coupling $\kappa(t)$ could disturb the internally circulating field from its approximately steady-state value. Thus, by jointly controlling the supply of excitation energy from the pump 326 together with the amplitude and modulation rate of the output-coupling coefficient $\kappa(t)$, the internally circulating field within the optical resonator 322 remains essentially at $E_{in,0}$ and essentially undisturbed by modulation of the output coupler 360. Under these conditions, the modulation response of the laser can be decoupled from the intrinsic response of the optical resonator 322 due to interactions between the circulating laser light and the gain medium 325.

In contrast, at low modulation frequencies (less than or near to relaxation resonance frequency $\omega_R$) and/or with large changes to the output-coupling coefficient $\kappa(t)$, the internally circulating field $E_{in}(t)$ will respond strongly to changes in the output-coupling coefficient $\kappa(t)$, causing potentially significant signal distortion in the modulated output signal 330. Thus, it would also no longer be the case that the internally circulating field would remain essentially undisturbed by modulation of the output coupler 360. However, by selecting modulation frequencies well above the relaxation resonance frequency $\omega_R$, where the overlap with the distortion band is low, and by controlling the output coupler to provide only small changes in the amplitude of the output-coupling coefficient $\kappa(t)$, the amplitude of the internally circulating field can be held relatively constant (or "quasi-constant"), with only minor fluctuations around a selected, steady-state level. Operating the coupler modulated laser 320 at modulation rates well above the relaxation resonance frequency $\omega_R$ to reduce distortion in the modulated output signal 330, it can be emphasized again, is contrary to the action of the pump-modulated laser 20, which in contrast requires operation at modulation rates not exceeding the relaxation frequency $\omega_R$.

The internally circulating field is ideally maintained at a selected, steady-state amplitude $E_{in,0}$. However, it may not always be possible to achieve true-steady state in the optical resonator 322 when the output coupler 360 is modulated and the pump 326 delivers dc excitation energy to the gain medium 325. As it may only be possible to maintain the amplitude of the internally circulating field at a quasi-constant level, the pump 326 can optionally be controlled to provide time-varying excitation energy to compensate for some of the fluctuations in the internally circulating field in the optical resonator 322. But even in this case, complete stabilization may not be possible. Thus, some fluctuation within an operable range defined around the desired steady-state value may be tolerable, which can be about 5%, but perhaps even as much as 20%, of the desired steady-state value in some cases. The exact size of the operable range may depend upon the physical parameters of the optical resonator 322 as well as characteristics of the downstream optical transmission link. For example, the specified range can be small enough so that fluctuation of the internally circulating field around the desired steady-state value is not so large that the resulting distortion in the modulated optical signal 330 exceeds tolerances specified for the transmission link. Different tolerances for different transmission links can suggest different specified ranges.

The fluctuation of the internally circulating field in the optical resonator 322 should also not be so large that the optical resonator 322 experiences laser turn-on/off dynamics. As will be appreciated, if the internally circulating energy is too greatly depleted, then equilibrium within the optical resonator 322 can be lost and laser oscillation can cease. Distortions due to excessive spontaneous emission and laser mode competition can therefore be produced in the modulated output signal 330 as equilibrium inside the optical resonator 322 is restored. In either case, the output-coupling coefficient $\kappa(t)$ can be selected so that changes in its amplitude are small enough to maintain the internally circulating field within an operable range around a desired steady-state value in which the distortion effects herein described are avoided. Of course, it should be appreciated that the selected modulation rate and desired steady-state power can also influence how much amplitude change in the output-coupling coefficient $\kappa(t)$ will be acceptable.

The range of modulation frequencies over which distortion in the modulated output signal 330 is significant can also be minimized by reducing $\omega_R$ and by reducing the magnitude of the changes in the output-coupling coefficient $\kappa(t)$. As described herein, the relaxation resonance frequency $\omega_R$ tends to be related inversely to the resonator Q factor. Thus, whereas Q factor often will be sacrificed for higher modulation rates in pump-modulated laser applications, the opposite holds true for the coupler modulated laser 320. Instead the optical resonator 322 can be designed to maximize its Q factor and thereby to also reduce distortions in the modulated output signal 330 by reducing the relaxation resonance frequency $\omega_R$.

Resonator finesse is another commonly utilized performance metric for optical resonators. As will be appreciated, finesse provides a combined indication of expected loss in the resonator (similar to the Q factor) and resonator free spectral range (FSR), which is defined as the frequency difference between the resonator centre frequency and the nearest resonance modes. As smaller resonators tend to have a larger FSR and can be not as lossy as compared with larger resonators, typically they will also have relatively large finesse. Since significant distortion can arise if the bandwidth of the modulated output signal 330 has non-negligible overlap with the resonator FSR, high finesse micron-scale resonators having relatively low relaxation resonance frequencies $\omega_R$ may be particularly suitable for implementing the optical resonator 322. In some embodiments, the optical resonator 322 is a micro-resonator formed monolithically with the modulated output coupler 360 on a semiconductor die. As mentioned, micron or millimeter sized resonators are suitable, for example.

Small high-Q, i.e. high finesse, resonators also have the benefit of exhibiting comparatively large internally circulating power $|E_{in,0}|^2$ for a given input of excitation energy from the pump 326 to maintain a quasi-constant amplitude of the circulating field. The magnitude of the output-coupling coefficient $\kappa(t)$ to optimize the laser output power also decreases with increasing finesse. Correspondingly, the output coupler 360 leverages the large amplitude of the internal field $E_{in,0}$ circulating in optical resonator 322 to enable only a very small output-coupling coefficient $\kappa(t)$, and small changes thereof, to generate the modulated output signal 330 at sufficient transmission power levels. Also as discussed, small changes in output-coupling coefficient $\kappa(t)$ have the additional benefit of minimizing disturbance to the circulating field $E_{in,0}$, which in turn limits the amount of distortion seen in the modulated output signal 330. By way of contrast to the external modulation scheme shown in FIG. 4, because the CW output signal 256 provided to the external modulator 250 has already had its output power reduced to transmission levels, much larger changes in a transmission coefficient of the external modulator 250 will be required relative to the changes required in output-coupling coefficient $\kappa(t)$ of the output coupler 360 to produce equivalent modulations. Thus, less input drive amplitude will also be required in the output coupler 360 to generate suitable changes in the output-coupling coefficients $\kappa(t)$. The efficiency savings in the output coupler 360 for intensity modulation, which are approximately equal to $$\left|\frac{E_{in,0}}{E_{out}}\right|^2,$$

can be quite significant.

By implementing the output coupler 360 using, for example, one or more Mach-Zehnder Interferometers (MZI)

having large modulation bandwidths, the advantages described herein can be realized. The pump 326 can be configured to deliver an excitation signal to the gain medium 325 that maintains a quasi-constant amplitude of the circulating field, and the output coupler 360 can be modulated at modulation rates well in excess of the relaxation resonance frequency $\omega_R$, to maintain a relatively constant power $P_{in,0}$ circulating internally in the optical resonator 322. The output coupler 360 can also be designed and operated such that the modulated output signal 330 will be chirp free or at least have controllable chirp. By leveraging the large internally circulating power $P_{in,0}$, only a relatively small output-coupling coefficient $\kappa(t)$, and small changes thereof, will be required to generate adequate power levels in the modulated output signal 330 for data transmission. As small changes to the output-coupling coefficient $\kappa(t)$ are achievable by a relatively small input drive amplitude to the output coupler 360, potentially significant efficiency gains are possible. The output coupler 360 is also configurable for implementing many common data modulation schemes, as will now be described in more detail.

Figure 7:
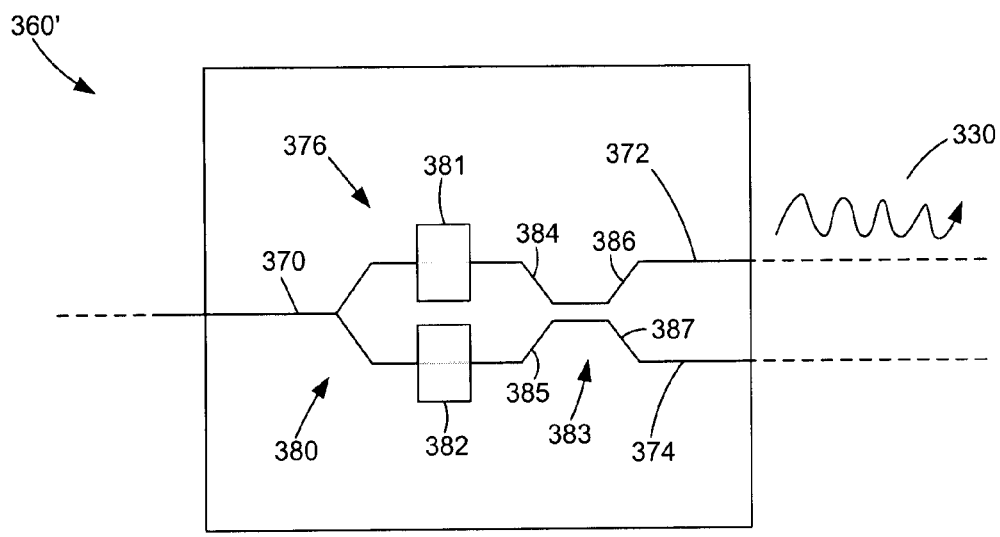
FIG. 7 is a schematic diagram illustrating an embodiment of the modulated output coupler shown in FIG. 6 that is suitable for implementing amplitude and Phase-Shift Keying (PSK) modulation schemes.

Referring to FIG. 7, illustrated therein according to embodiments of the present invention is a modulated output coupler 360', which is suitable for implementing any of an amplitude, binary phase-shift keying (BPSK), and differential phase-shift keying (DPSK) modulation scheme. An MZI 380 included in output coupler 360' is optically coupled at one end to the input port 370, and comprises a top branch 381 and bottom branch 382. It should be appreciated that the terms "top branch" and "bottom branch" are used only for convenience of reference to FIG. 7 and are not intended to be limiting. Thus, the relative positioning of the top and bottom branches 381, 382 could be reversed without affecting the operation of the output coupler 360'. Equally these elements could be referred to simply as first and second branches.

An optical field splitter at the input port 370 splits the incident light between the top branch 381 and the bottom branch 382. The optical field splitter can be a directional coupler, a cross-switch coupler, a multi-mode interference coupler, a y-junction, or some other suitable type of coupler. The energy splitting between the top and bottom branches 381, 382 can be equal (as in the case of an appropriately designed y-junction, for example), but can also be arbitrary. The optical field splitter can couple light to the top and bottom branches 381, 382 in phase, but can also impose a relative phase shift between the light coupled to the top branch 381 and the light coupled to bottom branch 382. The top and bottom branches 381, 382 are also optically coupled to a coupler 383 at an opposite end of the MZI 380. The coupler 383 can be a 3 dB coupler having four distinct ports, including a first input port 384 coupled to the top branch 381, a second input port 385 coupled to the bottom branch 382, as well as a first output port 386 and a second output port 387, which are coupled respectively to the output-coupled port 372 and the through port 374 of the output coupler 360'. The coupler 383 can be a directional coupler, a cross-switch coupler, a multi-mode interference coupler, or some other suitable type of coupler.

As is known, PSK is a digital modulation scheme that encodes data by controlling (i.e. modulating) the phase of a reference carrier signal. In some instances, PSK will map unique binary patterns to corresponding discrete phases in the reference carrier signal. By sensing a sequence of discrete phases in the reference carrier signal, the encoded binary patterns can be reconstructed at the receiver end of the optical transmission link. Typically the set of discrete phases will be evenly distributed over the range $(0, 2\pi)$. For example, a set of two discrete phases $(0, \pi)$ can be used to encode single-bit binary patterns $(0,1)$. This form of PSK is sometimes called Binary Phase-Shift Keying (BPSK). Alternatively a set of four discrete phases $$\left(0, \frac{\pi}{2}, \pi, \frac{3\pi}{2}\right)$$

can be used to encode two-bit binary patterns (00, 01, 10, 11), and is sometimes called Quaternary Phase-Shift Keying (QPSK). Limited perhaps only by the signal-to-range ratios of practical optical communication systems, any number of discrete phases can be mapped to different bit patterns. Increasing the order of the encoded bit patterns by specifying larger phase sets can increase the data rate of information encoded through phase-shift keying because each phase shift can represent a longer bit sequence. In other instances, instead of mapping discrete phases to bit patterns, differences in phase shift can be mapped to different bit patterns. Thus, in this type of differential PSK, a certain change in the phase shift represents a corresponding bit pattern. Either type of phase-shift keying can be implemented in the modulated output coupler 360'.

The MZI 380 and coupler 383 can be included in the interference section 376 of the modulated output coupler 360'. Light received into the MZI 380 from the input port 370 splits between the top and bottom branches 381, 382. Thus, part of the power input to the MZI 380 is directed to the top branch 381 and part of the input power is directed to the bottom branch 382. Power splitting may be equal between the top branch 381 and bottom branch 382, though it can also be unequal as will be appreciated. Moreover, the respective phase shifts experienced by optical signals through the top and bottom branches 381, 382 are independently controllable using the control signal 364. For example, in some embodiments, the control signal 364 comprises voltages applied to materials housed in the branches 381, 382 whose refractive indices change in response to the applied voltage. Controlling the amplitude of the applied voltage thereby controls the effective optical path length of each respective branch 381, 382 and allows for optical signals of generally different phases to be coupled together in coupler 383 to provide controlled optical interference.

As an alternative to controllably varying refractive index in the top and bottom branches 381, 382 to provide output modulation, it is also possible instead to controllably vary gain and/or attenuation ("gain/attenuation") in the top and bottom branches 381, 382. Again, for example, the control signal 364 comprises voltages applied to materials housed in the top and bottom branches 381, 382, only now whose gain/attenuation change in response to the applied voltage. By varying the amount of gain/attenuation, optical signals of generally different amplitude can be coupled together in coupler 383 to provide controlled optical interference. Control over one or more of refractive index and gain/attenuation in the interference section 376 using the control signal 364 is possible according to embodiments of the present invention. Control over other operating characteristics of the interference section 376 may also be possible to the same effect.

The top branch 381 and bottom branch 382 are coupled respectively to the first and second input ports 384, 385 of the coupler 383, wherein signals transmitted through these branches are optically interfered. In general, the interference can be destructive or constructive, but also partially destructive if desired. As determined by its scattering parameters, the coupler 383 will cross-couple the optically interfered signal to the output-coupled port 372 and, according to Eq. 3, a signal complementary to the optically interfered signal to the through port 374. Assuming a lossless coupler 360', light which is not emitted from the output-coupled port 372 will be routed to the through port 374 and thereby retained within the optical resonator 322. By controlling the differential phase shift (or alternatively the differential gain/attenuation or some other operating characteristic) between the top and bottom branches 381, 382, the coupler 383 can realize the different output-coupling coefficients κ(t) required to generate the modulated output signal 330 at the output-coupled port 372. Complementary through-coupling coefficients σ(t) can also be realized at the through-coupled port 374 for retaining laser light within the optical resonator 322 to continue circulating.

Simple amplitude modulation can be achieved in the output coupler 360' by biasing the MZI 380 so that the modulated output signal 330 emitted from the output-coupled port 372 has an initially non-zero amplitude, and so that the modulated output signal 330 is not significantly phase-shifted upon modulation. The non-zero amplitude of the modulated output signal 330 can represent some fractional part of the internally circulating power in the optical resonator 322. For chirp free modulation, the power from the input port 370 can be split equally between the top and bottom branches 381, 382, and the top and bottom branches 381, 382 can be controlled by the control signal 364 to provide equal but opposite phase shifts, respectively, of $$\frac{\Delta\theta}{2} \text{ and } -\frac{\Delta\theta}{2}$$

applied to the bias point of the MZI 380. Thus, the top and bottom branches 381, 382 can act as phase-advance and phase-delay branches. This is sometimes referred to as push-pull operation. Amplitude modulation can be achieved by time-varying the size of the incremental phase-shift Δθ(t) around the bias point of the MZI 380. Thereby the output coupler 360 will selectively emit more or less laser light from the optical resonator 322. The controlled incremental phase-shift Δθ(t) represents, or is at least relatable to, the encoded data signal. Alternatively, simple amplitude modulation can be applied to the modulated output signal 330, can also be achieved, by controllably varying the respective gain/attenuation of the top and bottom branches 381, 382 around the bias point of the MZI 380.

For implementing either BPSK or DPSK in the output coupler 360', the MZI 380 is biased for zero transmission to the output-coupled port 372. In other words, at the bias point, no appreciable optical output is seen at output-coupled port 372, resulting in substantial retention of laser light within the optical resonator 322 for internal circulation. The top and bottom branches 381, 382 are again controlled by the control signal 364 in push-pull configuration to phase-shifts of $$\frac{\Delta\theta}{2} \text{ and } -\frac{\Delta\theta}{2},$$

respectively, about the zero transmission bias point. It should be appreciated that the reverse configuration is possible as well, in which the top branch 381 can provide the phase-delay and the bottom branch 382 the phase advance. As the MZI 380 is operated at a zero transmission bias point, modulation of the incremental phase shift Δθ(t) around the bias point drives the MZI 380 through its maximum extinction point, and thereby produces a controllable phase shift in the output modulated signal 330 of either 0 or π, as required for BPSK or DPSK.

To bias the output coupler 360' at the zero transmission bias point, extra phase shifts can be applied to the $$\pm\frac{\Delta\theta}{2}$$

incremental phase-shifts, depending on the specific implementation of the output coupler 360'. For illustrative purposes only, it is assumed that the optical field splitter between the input port 370 and the top and bottom branches 381, 382 is a y-junction. It is assumed that the optical splitter provides equal power splitting between the top and bottom branches 381, 382, and additionally imposes no phase shift between light coupled to the top branch and the bottom branch. It is also assumed for illustrative purposes only that the coupler 383 provides equal cross-coupling and through-coupling of optical power, and additionally imposes a $$\frac{\pi}{2}$$

phase shift between through-coupled and cross-coupled light. As will be understood, the term through-coupling describes the amount of light incident at input port 384 that is coupled to output port 386, and likewise between input port 385 and output port 387. The term output-coupling similarly describes the amount of light incident at input port 384 that is coupled to output port 387, and likewise between input port 385 and output port 386. This coupling is typical of a 3-dB directional coupler. In this illustrative case, phase shifts of $$\mp\frac{\pi}{4}$$

can be applied to the top and bottom branches 381, 382 to set the zero transmission bias point of the MZI 380, thereby resulting in total phase-shifts of $$-\frac{\pi}{4} + \frac{\Delta\theta}{2} \text{ and } \frac{\pi}{4} - \frac{\Delta\theta}{2},$$

respectively. Under these conditions, the amount of the resulting phase shift, 0 or π, in the output modulated signal 330 is controllable depending on the polarity of the incremental phase shift Δθ(t) in the MZI 380.

When the output coupler 360' is thus configured for BPSK or DPSK, taking into account the illustrative assumptions made of the output coupler 360' above, it can be shown that the output-coupling and through-coupling coefficients will have the form $$\kappa(t) = e^{j\pi/4}\sin\left(\frac{\Delta\theta}{2}\right) \quad (4a)$$

$$\sigma(t) = e^{j\pi/4}\cos\left(\frac{\Delta\theta}{2}\right),$$

which through satisfaction of Eq. 3 are indeed complementary expressions. It is noted that Eq. 4a assumes lossless operation of the output coupler 360'. Accordingly, as will be appreciated, these expressions for κ(t) and σ(t) may only be approximate and not general expressions. Of course, the exact form of Eq. 4a may differ for other configurations or assumptions made of the output coupler 360'.

Leveraging the comparatively large internally circulating field of amplitude $E_{in,0}$ in the optical resonator 322 permits a very small incremental phase shift Δθ(t) to be implemented by the MZI 380 about its zero transmission bias point. For example, it will often be sufficient for the output power $P_{out}$ to equal only about 1-2% of the circulating power $P_{in,0}$, which requires a phase shift of only a few degrees. The expression for the output-coupling coefficient κ(t) can then also be simplified to $$\kappa(t) \approx e^{j\pi/4} \frac{\Delta\theta}{2}, \quad (4b)$$

using the well known approximation of the sine function for small arguments. It is at least in part due to the small incremental phase shifts capable of providing BPSK or DPSK that the output modulated coupler 360' is able to realize large efficiency gains over the external modulator 250. It will be recalled that the external modulator 250 requires comparatively much larger phase shifts (and thus also input drive amplitude) to achieve the same phase inversion for BPSK with a comparable output amplitude. As compared to modulators used in present optical communication systems, the powers savings realized by the output coupler 360' can be as high as 2 or 3 orders of magnitude.

Figure 8:
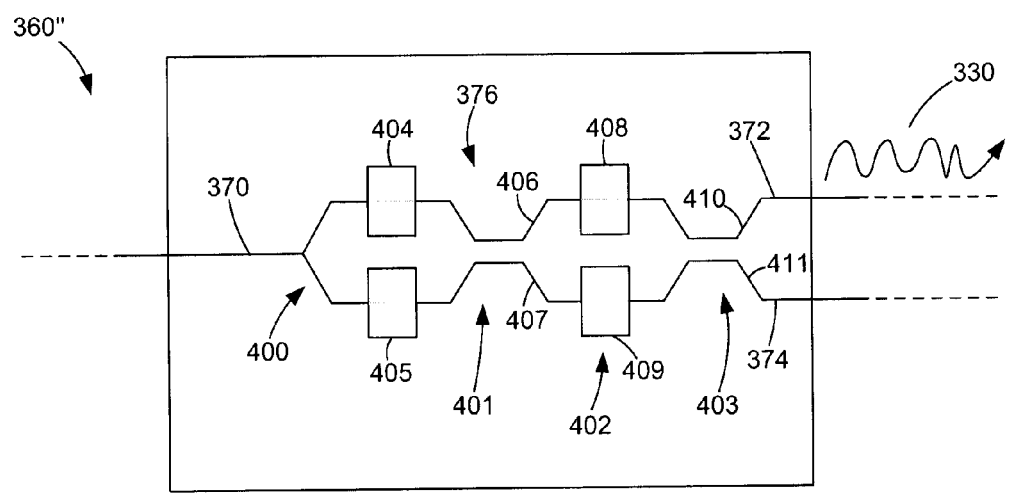
FIG. 8 is a schematic diagram illustrating an embodiment of the modulated output coupler shown in FIG. 6 that is suitable for implementing a Quadrature Amplitude Modulation (QAM) scheme.

Referring now to FIG. 8, illustrated therein according to embodiments of the present invention is a modulated output coupler 360'', which is suitable for implementing a Quadrature Amplitude Modulation (QAM) scheme. The output coupler 360'' comprises first MZI 400, first coupler 401, second MZI 402, and second coupler 403. First and second couplers 401, 403 can be 3 dB couplers. The first MZI 400 is optically coupled at one end to the input port 370 to receive circulating light into the output coupler 360''. Top branch 404 and bottom branch 405 of the first MZI 400 couple into respective input ports of the first coupler 401. Likewise the first output port 406 and second output port 407 of the first coupler 401 respectively couple into a top branch 408 and bottom branch 409 of the second MZI 402. As with first MZI 400, the top and bottom branches 408, 409 couple into respective input ports of the second coupler 403. Finally, as shown, the output-coupled port 372 of the output coupler 360'' is coupled to the first output port 410 of the second coupler 403, while the through port 374 is coupled to the second output port 411. The terms "top branch" and "bottom branch" are again used for convenient reference to FIG. 8 only. As with FIG. 7, one or both of the first and second couplers 401, 403 can be a directional coupler, a cross-switched coupler, a multi-mode interference coupler, or some other suitable coupler. The arrangement of MZIs 400, 402 and couplers 401, 403 in the interference section 376 is configurable for applying QAM to the modulated output signal 330.

In this configuration of the output coupler 360'', the top and bottom branches in the first and second MZIs 400, 402 are controllable, through proper calculation of the control signal 364, to provide respective phase shifts that apply QAM to the modulated output signal 330. In particular, the first MZI 400 is controllable to provide a phase-advance $$\frac{\Delta\theta_I}{2}$$

in the top branch 404, and a conjugate phase-delay $$-\frac{\Delta\theta_I}{2}$$

in the bottom branch 405. The second MZI 402 is similarly controllable to provide a phase-advance $$\frac{\Delta\theta_Q}{2}$$

in the top branch 408, and a conjugate phase delay $$-\frac{\Delta\theta_Q}{2}$$

in the bottom branch 409. By proper time-variation of the incremental in-phase and quadrature phase shifts $\Delta\theta_I(t)$ and $\Delta\theta_Q(t)$, respectively, the modulated optical signal 330 emitted from the output-coupled port 372 will comprise both in-phase and quadrature modulated signal components as required in QAM. A signal complementary to the modulated output signal 330 will be directed to the through port 374 for internal circulation within the optical resonator 322, as seen before.

As will be appreciated, QAM (either analog or digital) imparts information (in the form of a transmission data signal) onto both the amplitude and phase of the modulated optical signal 330, implying that the modulated output signal 330 should have arbitrary and controllable magnitude and phase. This condition is met in the output coupler 360'' when two optical signals of different amplitudes are provided to the second MZI 402, wherein they are subjected to a differential phase shift and then coupled to the output-coupled port 372; the combination of the first MZI 400 and the first coupler 401 can be configured to generate the necessary different amplitude optical signals. More specifically, the top branch 404 is controlled through the control signal 364 to provide an incremental phase-advance of $$\frac{\Delta\theta_I}{2},$$

while the bottom branch 405 is controlled to provide a corresponding incremental phase-delay of $$-\frac{\Delta\theta_I}{2}.$$

The size of the incremental phase shift $\Delta\theta_I$ determines the splitting ratio between the two signals appearing at the output ports 406, 407 that couple the second MZI 402. The control signal 364 moreover controls the top branch 408 to provide an incremental phase-advance of $$\frac{\Delta\theta_Q}{2}$$

and the bottom branch 405 to provide a corresponding incremental phase-delay of $$-\frac{\Delta\theta_Q}{2}.$$

Thus, both the first MZI 400 and second MZI 402 can be operated in push-pull configuration as well. The signal directed by the second coupler 403 to the output-coupled port 372, i.e. the modulated output signal 330, is then a summation of the two different amplitude signals generated by the first coupler 401 and phase-shifted in the second MZI 402. To bias the output coupler 360" for a small output-coupling coefficient κ(t) relative to the internally circulating field $E_{in,0}$, as is desirable for high Q or high finesse optical resonators, extra phase shifts are applied to the $$\pm\frac{\Delta\theta_I}{2} \text{ and } \pm\frac{\Delta\theta_Q}{2}$$

incremental phase-shifts, which depend on the specific implementation of the output coupler 360".

It is evident that the configuration of the modulated output coupler 360" shown in FIG. 8 will generate both an in-phase and quadrature component in the modulated output signal 330 as required for QAM. Again for illustrative purposes only, it is assumed that the optical field splitter between the input port 370 and the top and bottom branches 404, 405 provides equal power splitting between the top and bottom branches 404, 405, and additionally imposes no phase shift between light coupled to the top branch 404 and the bottom branch 405, which is typical of an appropriately designed y-junction. It is assumed for illustrative purposes only that each of the couplers 401, 403 provide cross-coupling and through-coupling, as described above, which again is typical of 3-dB directional couplers. In this illustrative case, to bias the output coupler 360" for a small output-coupling coefficient κ(t), extra phase shifts of $$\mp\frac{\pi}{2}$$

can be applied to the top and bottom branches 404, 405, respectively, together with extra phase shifts of $$\pm\frac{\pi}{4}$$

applied to the top and bottom branches 408, 409. This will result in total phase-shifts of $$-\frac{\pi}{2}+\frac{\Delta\theta_I}{2},\; \frac{\pi}{2}-\frac{\Delta\theta_I}{2},\; \frac{\pi}{4}+\frac{\Delta\theta_Q}{2},\text{ and }-\frac{\pi}{4}-\frac{\Delta\theta_Q}{2}$$

in the branches 404, 405, 408, 409, respectively.

Using in-phase and quadrature control signals $\Delta\theta_I(t)$ and $\Delta\theta_Q(t)$, respectively, to control the first and second MZIs 400 and 402, the modulated output coupler 360" can be shown to achieve output-coupling and through-coupling coefficients given by $$\kappa(t) = \frac{e^{j\pi/4}}{\sqrt{2}}\sin\left(\frac{\Delta\theta_I(t)+\Delta\theta_Q(t)}{2}\right)+\frac{je^{j\pi/4}}{\sqrt{2}}\sin\left(\frac{\Delta\theta_I(t)-\Delta\theta_Q(t)}{2}\right) \quad (5a)$$

$$\sigma(t) = \frac{e^{j\pi/4}}{\sqrt{2}}\cos\left(\frac{\Delta\theta_I(t)+\Delta\theta_Q(t)}{2}\right)-\frac{je^{j\pi/4}}{\sqrt{2}}\cos\left(\frac{\Delta\theta_I(t)-\Delta\theta_Q(t)}{2}\right),$$

where again κ(t) represents the coefficient of output-coupling, σ(t) represents the coefficient of through-coupling, and from Eq. 3, κ(t) is complementary to σ(t). For small angles $\Delta\theta_I(t)$ and $\Delta\theta_Q(t)$, again the expression for the output-coupling coefficient κ(t) can be simplified to $$\kappa(t) \approx \frac{\Delta\theta_Q(t)}{2}+j\frac{\Delta\theta_I(t)}{2}, \quad (5b)$$

which is perhaps a more useful form. It is apparent from Eq. 5b that variation of $\Delta\theta_I(t)$ and $\Delta\theta_Q(t)$ allows for arbitrary and controllable modulation of the real and imaginary components of κ(t), in turn enabling arbitrary and controllable modulation of amplitude and phase in the modulated output signal 330.

Figure 9:
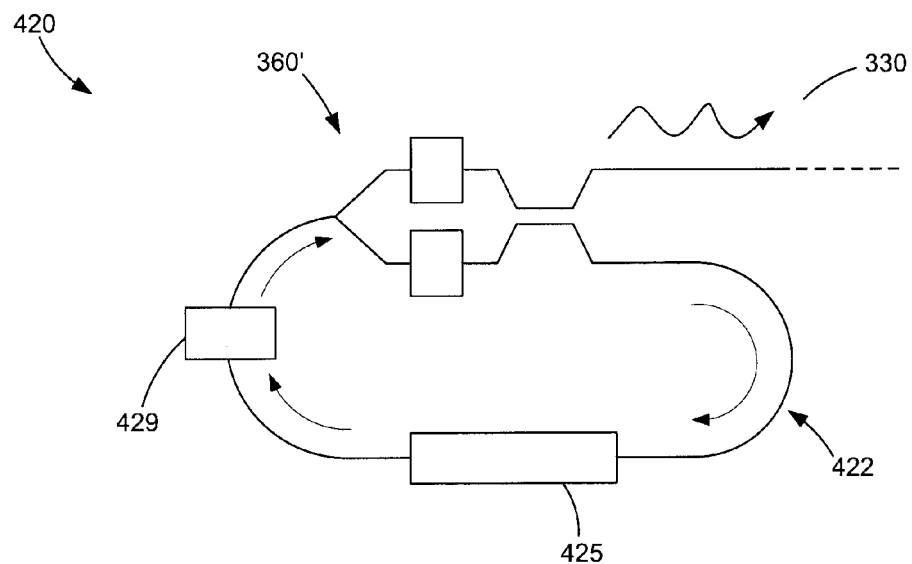
FIG. 9 is a schematic diagram illustrating an alternative embodiment of the laser shown in FIG. 5 that includes a wavelength tuning section.

Reference is now made to FIG. 9, which is a schematic diagram illustrating an alternative embodiment of the coupler modulated laser 320 shown in FIG. 5 that is wavelength tunable. The coupler modulated laser 420 comprises optical resonator 422 implemented with the output coupler 360' of FIG. 7, although it should be appreciated that the output coupler of 360" of FIG. 8 could be included instead. Gain medium 425 is housed inside the optical resonator 422 and supplied with excitation energy from a suitable pump (not shown). The coupler modulated laser 420 further comprises wavelength tuning section 429 included in the path of the laser light circulating internally within the optical resonator 422. In response to a wavelength tuning control signal provided by a wavelength controller (not shown), the wavelength tuning section 429 selectively adjusts a refractive index of the optical resonator 422, thereby altering the resonant wavelengths of the optical resonator 422. Accordingly, the wavelength of the modulated output signal 330 can be tuned. Of course, it should be appreciated that the wavelength of the modulated output signal 330 can depend on other physical properties of the optical resonator 422 as well, and that the degree of tuning possible may be limited. For larger variations in wavelength, therefore, it may be necessary to adjust or otherwise reconfigure the optical resonator 422.

Figure 10:
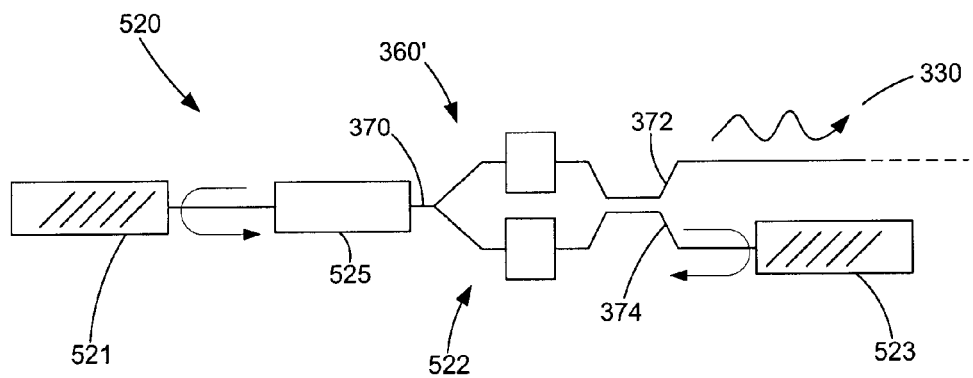
FIG. 10 is a schematic diagram illustrating a standing wave laser with a modulated output coupler, according to embodiments of the present invention.

Reference is now made to FIG. 10, which is a schematic diagram illustrating a standing wave laser incorporating a modulated output coupler in accordance with embodiments of the present invention. The coupler modulated laser 520 comprises the output coupler 360' included in the optical resonator 522. Again it should be appreciated that the output coupler 360" could be included instead. A first reflector 521, which can be a distributed feedback (DFB) grating or a Bragg reflector, for example, is optically coupled to the input port 370 of the output coupler 360'. Also a second reflector 523 is optically coupled to the through port 374 of the output coupler 360'. One or both of reflectors 521, 523 can be tunable with a tunable reflection spectrum. As before, gain medium 525 can be housed within the optical resonator 522, which defines a confinement path for the light circulating therein. Alternatively, as illustrated for example in FIG. 11, the gain medium 525 can be housed in one or both of the reflectors 521,523.

Internal laser light incident on the first reflector 521 will be reflected back into the input port 370 through the gain medium 525, just as laser light incident on the second reflector 523 will be reflected back into the output coupler 360'. If good isolation is achieved between the output-coupled port 372 and the through port 374, only a negligible amount of light entering the through port 374 will be directed to the output-coupled port 372 and significant distortions in the modulated output signal 330 will be avoided. The majority of the circulating laser light will be directed through to the input port 370 of the output coupler 360', thereby creating a standing wave pattern in the optical resonator 522. The reflectors 521, 523 can also be tunable to control the wavelength of the modulated output signal 330 by affecting an amount of optical feedback in the optical resonator 522. The modulated output coupler 360' in the laser 520 can otherwise function as described herein.

Figure 11:
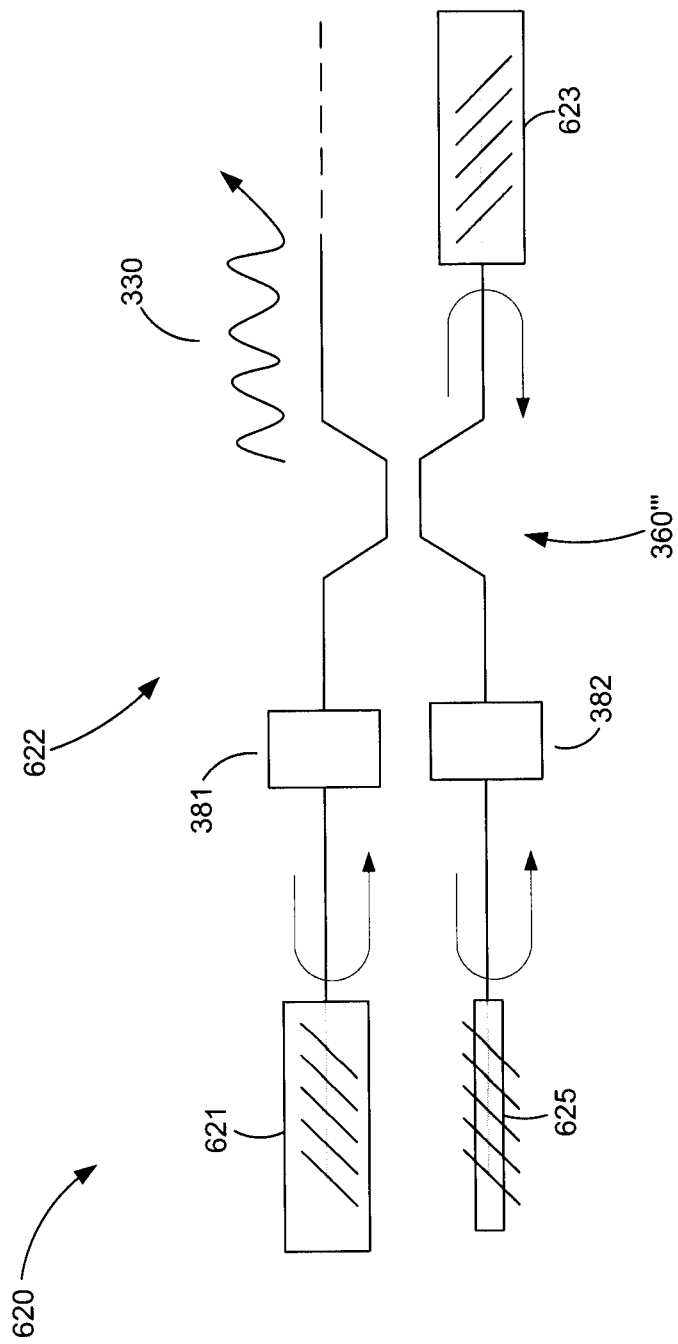
FIG. 11 is a schematic diagram illustrating an alternative embodiment of the laser shown in FIG. 10 in which the gain medium is housed in a reflector.

Reference is now made to FIG. 11, which is a schematic diagram illustrating an alternative embodiment of the coupler modulated laser 520 shown in FIG. 10. The coupler modulated laser 620 comprises output coupler 360''' included in optical resonator 622. The output coupler 360''' is similar to the output coupler 360' but includes a corresponding input port for each of the top branch 381 and bottom branch 382. A first reflector 621 (e.g. a DFB grating or Bragg reflector) is optically coupled to the top branch input port. A second reflector 623 is optically coupled to a through port of the output coupler 360'''. A third reflector 625 is also optically coupled to the bottom branch input port. One or more of the reflectors 621, 623, 625 can be tunable with a tunable reflection spectrum. The output coupler 360'' and the reflectors 621, 623 and 625 can all be formed in the optical resonator 622. As illustrated, the gain medium for the optical resonator 622 is housed in the reflector 625, but could alternatively be housed in any or all of the reflectors 621, 623, 625. Again with good isolation between the through port and output-coupled ports of the output coupler 360''', reflections in the reflectors 621, 623, 625 create a standing wave pattern in the optical resonator 622. Controlling the output coupler 360''' using the control signal 364 will therefore generate the modulated optical signal 330, substantially as described herein.

Figure 12:
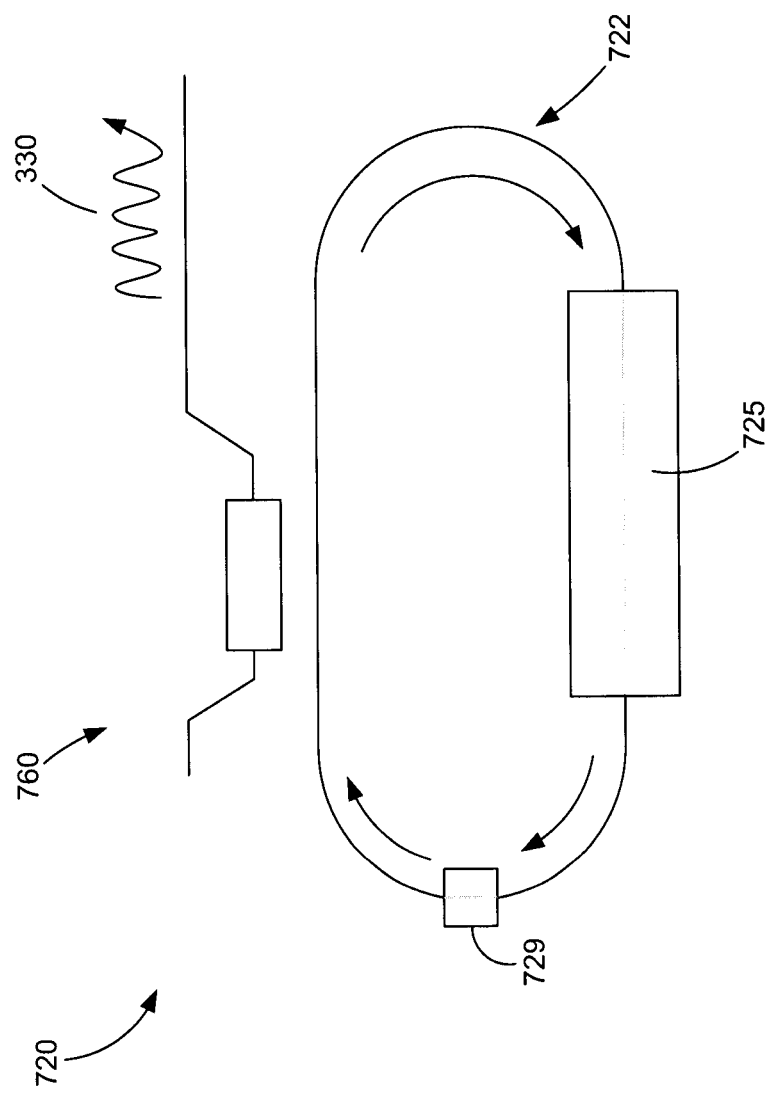
FIG. 12 is a schematic diagram illustrating an alternative embodiment of the laser shown in FIG. 10 that includes a directional coupler.

Reference is now made to FIG. 12, which is a schematic diagram illustrating an alternative embodiment of the coupler modulated laser 420 shown in FIG. 9 in which the output coupler includes a directional coupler. The coupler modulated laser 720 comprises optical resonator 722 implemented in this case using a directional coupler 760, or perhaps a cross-switch coupler, instead of a combination MZI-3 dB coupler. Gain medium 725 is housed inside the optical resonator 722 in the path of the circulating light and is supplied with excitation energy from a suitable pump (not shown). The optical resonator 722 further includes optional wavelength tuning section 729, which is also included in the path of the circulating laser light. By application of the control signal 364 to the directional coupler 760, laser light circulating in the optical resonator 722 is controllably coupled into the directional coupler 760, wherein through modulation of the output coupler 760, the output coupled light exits the directional coupler 760 as the modulated optical signal 330. As will be appreciated, a different control signal 364 can be required to modulate the output coupler 760, as compared to the control signal used to modulated output coupler 360'. Otherwise the output coupler 760 can function substantially according to embodiments of the invention described herein.

Figure 13:
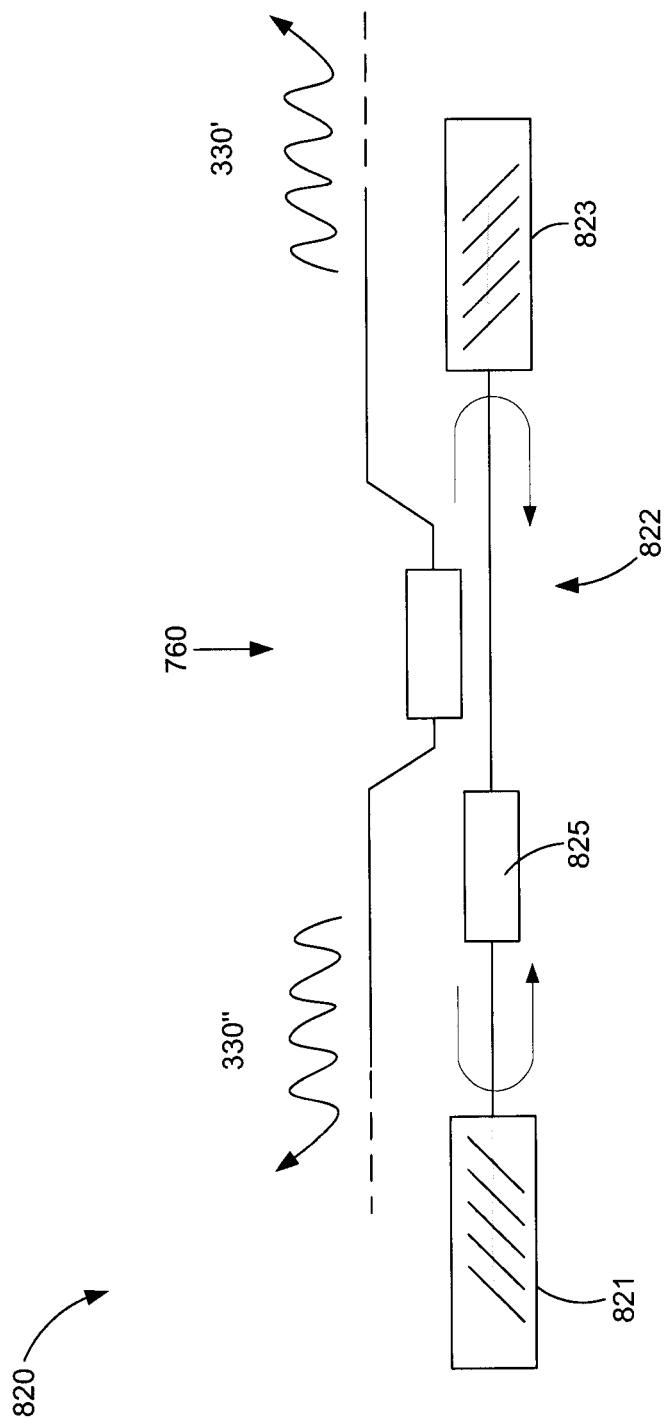
FIG. 13 is a schematic diagram illustrating an alternative embodiment of the laser shown in FIG. 10 that includes a directional coupler.

Reference is now made to FIG. 13, which is a schematic diagram illustrating an alternative embodiment of the coupler modulated laser 520 shown in FIG. 10 that includes a directional coupler. The coupler modulated laser 820 comprises directional coupler 760 instead of a combination MZI-3 dB coupler. A first reflector 821 (again e.g. a DFB grating or Bragg reflector) is optically coupled to a second reflector 823. Reflectors 821, 823 can again be tunable with a wavelength tunable reflection spectrum. The first reflector 821 and second reflector 823 can provide terminal reflection points for the optical resonator 822 in which gain medium 825 is again housed in a waveguide defined therein and supplied with excitation energy. As before, the reflectors 821, 823 can be wavelength tunable and can house the gain medium 825. Light circulating in the optical resonator 822 will form a standing wave pattern between the two reflectors 821, 823, some of which is controllably coupled into the directional coupler 760. Again the control signal 364 can be applied to control an operating characteristic of the directional coupler 760, such as its refractive index, to selectively couple light energy. As the directional coupler 760 is a 4-port device, if desired, modulated output signal 330' can be emitted from one end of the directional coupler 760, while a second modulated signal 330'' can be emitted from an opposite end thereof. Alternatively, only one modulated output signal can be generated. Otherwise the output coupler 760 can function substantially accordingly to embodiments of the invention described herein.

Figure 14:
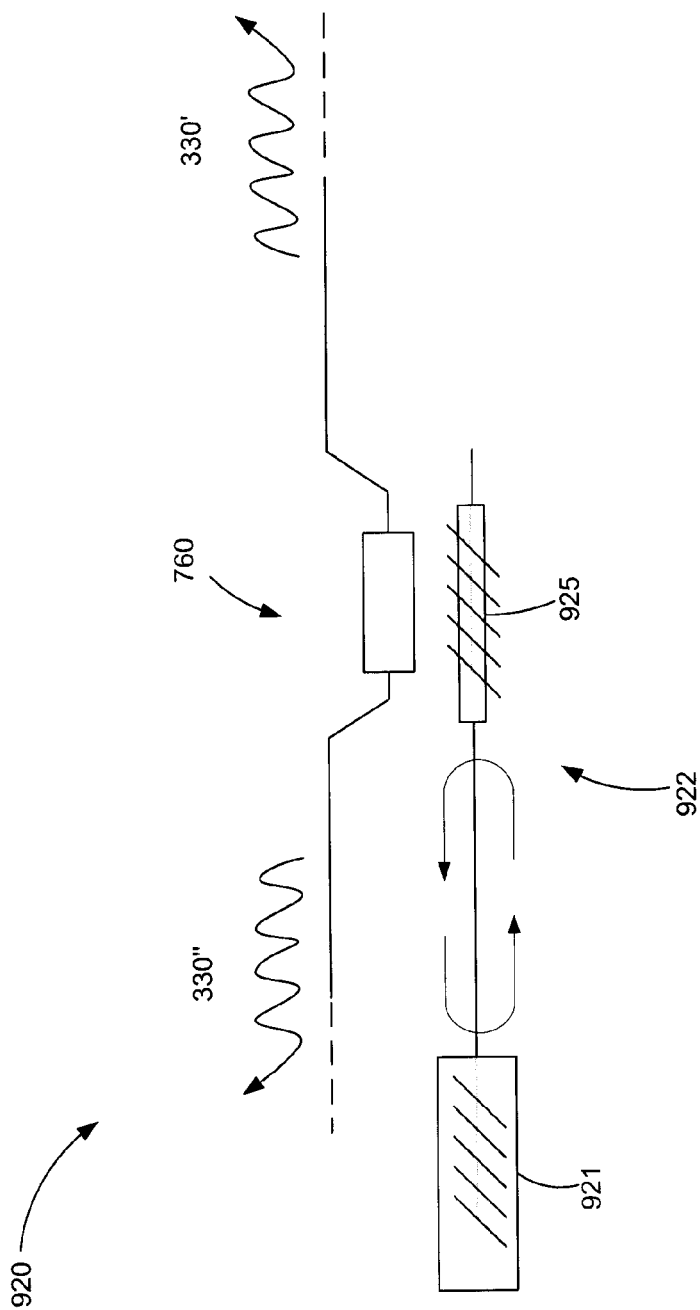
FIG. 14 is a schematic diagram illustrating an alternative embodiment of the laser shown in FIG. 10 that includes a directional coupler and in which the gain medium is housed in a reflector.

Reference is now made to FIG. 14, which is a schematic diagram illustrating an alternative embodiment of the coupler modulated laser 520 shown in FIG. 10 that includes a directional coupler and in which the gain medium is housed in a reflector or waveguide. The coupler modulated laser 920 comprises the directional coupler 760 instead of a combination MZI-3 dB coupler. A first reflector 921 (e.g. a DFB grating) is optically coupled to a second reflector 925. The gain medium is illustrated as being housed in the reflector 925, though it could be housed in a waveguide defined in the optical resonator 922 instead. The first reflector 921 and second reflector 925 can provide terminal reflection points for the optical resonator 922, as well as wavelength tuning for the modulated output signal 330. Light circulating in the optical resonator 922 will form a standing wave pattern between the two reflectors 921, 932. By locating the directional coupler 760 in close proximity to the second reflector 925, and in response to application of a suitable control signal 364, some of the light reflected in the reflector 925 can be controllably coupled into the directional coupler 760. Again the control signal 364 can be applied to control an operating characteristic of the directional coupler 760, such as its refractive index. Again if desired, modulated output signal 330' can be emitted from one end of the directional coupler 760, while a second modulated signal 330'' can be emitted from an opposite end thereof. Alternatively, only one output can be provided. Otherwise the output coupler 760 can function substantially according to embodiments of the invention described herein.

While the above description provides examples and specific details of various embodiments, it will be appreciated that some features and/or functions of the described embodiments admit to modification without departing from the scope of the described embodiments. For example, the modulated output coupler can be suitable for operation with many different configurations of lasers. The detailed description of embodiments presented herein is intended to be illustrative of the invention, the scope of which is limited only by the language of the claims appended hereto.

The invention claimed is:

1. A modulated laser comprising:
an optical resonator for light to circulate within;
a gain medium housed within the optical resonator in the path of the circulating light;
a pump for delivering excitation energy to the gain medium above a laser threshold of the optical resonator to bring the circulating light into coherent oscillation; and
an output coupler included in the optical resonator in the path of the circulating light, the output coupler responsive to a control signal to selectively allow a fraction of the circulating light to exit the optical resonator as a modulated optical signal, the output coupler having an input port to receive the circulating light into the output coupler, an output-coupled port to emit the modulated optical signal, and a through port complementary to the output-coupled port to retain unemitted light within the optical resonator.

2. The laser of claim 1, wherein the output coupler further comprises an interference section providing optical coupling between the input port and each of the output-coupled port and the through port, the interference section having an operating characteristic that is controllable by the control signal to provide selective optical interference in the interference section.

3. The laser of claim 2, wherein the operating characteristic of the interference section is controllable to generate the modulated optical signal at the output-coupled port and an optical signal complementary to the modulated optical signal at the through port.

4. The laser of claim 3, wherein the operating characteristic of the interference section is one of a refractive index and gain/attenuation.

5. The laser of claim 4, wherein the interference section of the output coupler is formed integrally with the optical resonator.

6. The laser of claim 1, wherein the output coupler comprises at least one Mach-Zehnder Interferometer (MZI).

7. The laser of claim 1, wherein the output coupler comprises at least one of a directional coupler, a multi-mode interference coupler, a waveguide junction and splitter, a Bragg reflector and a resonator, and wherein one of a refractive index and gain/attenuation of the output coupler is controllable by the control signal to generate the modulated optical signal.

8. The laser of claim 1, wherein the output coupler is responsive to the control signal to modulate at least one of amplitude and phase in the modulated optical signal.

9. The laser of claim 8, wherein the output coupler is responsive to the control signal applies at least one of an amplitude, a Phase-Shift Keying (PSK), and a Quadrature Amplitude Modulation (QAM) modulation scheme to the modulated optical signal.

10. The laser of claim 1, wherein the output coupler and pump are jointly controllable to decouple a modulation response of the laser from an intrinsic response of the circulating light due to interaction with the gain medium, the laser thereby substantially inheriting a modulation response of the output coupler.

11. The laser of claim 1, wherein the output coupler and pump are jointly controllable to maintain a power level of the circulating light within an operable range around a selected, steady-state power level.

12. The laser of claim 1, wherein the output coupler is controllable at a modulation rate selected to exceed a relaxation resonance frequency of the laser.

13. The laser of claim 1, wherein the output coupler is controllable to provide amplitude changes in a coefficient of output-coupling.

14. The laser of claim 1, wherein the pump is configured to deliver dc excitation energy to the gain medium.

15. The laser of claim 1, wherein the modulated output signal is free of chirp or has controllable chirp.

16. The laser of claim 1, further comprising at least one wavelength tuning section included in the optical resonator in the path of the circulating light, the wavelength tuning section selectively adjusting a refractive index or optical feedback of the optical resonator to control a wavelength of the modulated optical signal.

17. The laser of claim 1, wherein the optical resonator comprises a ring structure having opposite ends optically coupled with the input and through ports of the output coupler, the ring structure and output coupler defining a ring resonator for the circulating light.

18. The laser of claim 1, wherein the optical resonator further comprises a reflector optically coupled to each of the input port and through port of the output coupler, the reflectors creating a standing wave pattern for the circulating light.

19. The laser of claim 1, wherein the output coupler is formed monolithically on a semiconductor die.

20. The laser of claim 1, wherein the output coupler is integrated heterogeneously within the optical resonator.

21. The laser of claim 1, wherein the optical resonator is a high-finesse, micron or millimeter scale resonator.

22. A method of modulating a laser comprising an optical resonator for light to circulate within and a gain medium housed within the optical resonator in the path of the circulating light, the method comprising:
delivering excitation energy to the gain medium above a laser threshold of the optical resonator to bring the circulating light into coherent oscillation;
providing an output coupler in the optical resonator in the path of the circulating light;
determining a control signal for the output coupler, the output coupler responsive to the control signal to selectively allow a fraction of the circulating light to exit the optical resonator; and
controlling the output coupler using the control signal to generate a modulated optical signal by;
receiving the circulating light into an input port of the output coupler;
generating the modulated optical signal at an output-coupled port of the output coupler in response to the control signal; and
directing unemitted light to a through port of the output coupler to be retained within the optical resonator.

23. The method of claim 22, wherein an interference section provides optical coupling between the input port and each of the output-coupled port and the through port, and controlling the output coupler comprises controlling an operating characteristic of the interference section using the control signal to provide selective optical interference in the interference section.

24. The method of claim 23, wherein controlling the operating characteristic of the interference section generates the modulated optical signal at the output-coupled port and an optical signal complementary to the modulated optical signal at the through port.

25. The method of claim 24, wherein the operating characteristic of the interference section is one of a refractive index and gain/attenuation.

26. The method of claim 22, wherein controlling the output coupler comprises modulating at least one of amplitude and phase in the modulated optical signal.

27. The method of claim 26, wherein controlling the output coupler comprises applying at least one of an amplitude, a Phase-Shift Keying (PSK), and a Quadrature Amplitude Modulation (QAM) modulation scheme to the modulated optical signal.

28. The method of claim 22, further comprising jointly controlling the output coupler and the pump to decouple a modulation response of the laser from an intrinsic response of the circulating light due to interaction with the gain medium.

29. The method of claim 22, further comprising jointly controlling the output coupler and the pump to maintain a power level of the circulating light within an operable range around a selected, steady-state power level.

30. The method of claim 22, wherein controlling the output coupler comprises selecting a modulation rate that exceeds a relaxation resonance frequency of the laser and controlling the output coupler at the selected modulation rate.

31. The method of claim 22, wherein controlling the output coupler comprises controlling amplitude changes in a coefficient of output-coupling.

32. The method of claim 22, wherein the excitation energy comprises dc excitation energy.

33. The method of claim 22, wherein the modulated output signal is free of chirp or has controllable chirp.

34. The method of claim 22, wherein the method further comprises controlling a wavelength of the modulated optical signal by selectively adjusting a refractive index or optical feedback of the optical resonator using at least one wavelength tuning section included in the optical resonator in the path of the circulating light.

* * * * *